US010967705B2

United States Patent
Shen et al.

(10) Patent No.: US 10,967,705 B2
(45) Date of Patent: Apr. 6, 2021

(54) AIR PURGE METHOD IN A VEHICLE AND AN AIR PURGE SYSTEM

(71) Applicant: Ford Global Technologies LLC, Dearborn, MI (US)

(72) Inventors: Kevin Shen, Nanjing (CN); Wei Xu, Nanjing (CN); Xuezhi Jin, Nanjing (CN); Hogan Jiang, Nanjing (CN)

(73) Assignee: Ford Global Technologies LLC, Dearborn, MI (US)

( * ) Notice: Subject to any disclaimer, the term of this patent is extended or adjusted under 35 U.S.C. 154(b) by 358 days.

(21) Appl. No.: 15/922,599

(22) Filed: Mar. 15, 2018

(65) Prior Publication Data

US 2018/0304719 A1 Oct. 25, 2018

(30) Foreign Application Priority Data

Apr. 20, 2017 (CN) .......................... 201710259913.9

(51) Int. Cl.
*B60H 1/00* (2006.01)
*B60H 3/00* (2006.01)
*F24F 8/50* (2021.01)

(52) U.S. Cl.
CPC .......... *B60H 1/008* (2013.01); *B60H 1/00657* (2013.01); *B60H 1/00778* (2013.01); *B60H 1/00792* (2013.01); *B60H 1/00828* (2013.01); *B60H 3/0085* (2013.01); *F24F 8/50* (2021.01)

(58) Field of Classification Search
CPC ................ B60H 1/008; B60H 1/00778; B60H 1/00657; B60H 1/00828
See application file for complete search history.

(56) References Cited

U.S. PATENT DOCUMENTS

| 5,775,406 A | 7/1998 | Ghitea, Jr. | |
|---|---|---|---|
| 6,769,979 B2 | 8/2004 | Abe et al. | |
| 7,013,656 B2 | 3/2006 | Yanagimachi et al. | |
| 7,705,722 B2 | 4/2010 | Shoemaker et al. | |
| 2003/0121988 A1* | 7/2003 | Rutyna | B60H 1/248 236/49.3 |
| 2004/0194479 A1* | 10/2004 | Umebayashi | B60H 1/00778 62/126 |
| 2004/0200228 A1* | 10/2004 | Yanagimachi | B60H 1/00864 62/180 |

(Continued)

FOREIGN PATENT DOCUMENTS

DE 102004062480 A1 4/2006
JP 2006290032 A 10/2006

OTHER PUBLICATIONS http://www.bta-mall.com/product_detail.php?id=SKUB00WHXU03U &search_param=+Vehicle+Parts+%26+Accessories+%3E+Motor+ Vehicle+Care+%3E+Vehicle+Decor+%3E+Vehicle+Air+Fresheners &item_name=Dr.luck+Air+Purifier+For+Car+Use+Dr301-pink+ With+12v+Dc+Car+Adapter%2C+Built-in+Air+Detection+Device+ 3+Lights+Display%2C+Two-leg+Work+Speed+Adjustment%2C+ Triple+Air+Filtering+(pink%2C+Pack+Of+1)&r= >.

(Continued)

*Primary Examiner* — Steven B McCallister
*Assistant Examiner* — Charles R Brawner
(74) *Attorney, Agent, or Firm* — David Coppiellie; Kolitch Romano LLP

(57) ABSTRACT

An air purge method in a vehicle is provided. The air purge method comprises starting a vehicle ventilation device in response to ventilation instruction; determining a current air purge status based on an operation time of the ventilation device; and indicating the current air purge status via an air purge indication device.

15 Claims, 8 Drawing Sheets

(56) References Cited

U.S. PATENT DOCUMENTS

| | | | |
|---|---|---|---|
| 2004/0222307 A1* | 11/2004 | DeLuca | F24F 11/30 236/46 R |
| 2007/0082601 A1* | 4/2007 | Desrochers | F24F 3/0442 454/256 |
| 2009/0193821 A1* | 8/2009 | Ozeki | B60H 1/00742 62/89 |
| 2012/0264361 A1 | 10/2012 | Scheer et al. | |
| 2014/0326430 A1* | 11/2014 | Carpenter | B60L 1/02 165/41 |
| 2018/0251008 A1* | 9/2018 | Androulakis | B60H 1/00295 |

OTHER PUBLICATIONS https://owners.infinitiusa.com/content/manualsandguides/FX/2009/2009_FX_QRG.pdf.
https://prodrive-technologies.com/products/pm25-sensor/.

* cited by examiner

AIR PURGE METHOD IN A VEHICLE AND AN AIR PURGE SYSTEM

RELATED APPLICATION

This application claims the benefit of Chinese Patent Application No.: CN 201710259913.9 filed on Apr. 20, 2017, the entire contents thereof being incorporated herein by reference.

FIELD

The present application relates to methods and systems to purge air in a vehicle compartment, in particular, relates to methods and systems to determine an air purge status and indicate the air purge status to a user.

BACKGROUND

Gases may be diffused from interior parts of a vehicle. For example, the material forming the vehicle trim panels or other parts may evaporate some organic gases and activities of microorganism may generate gases and suspended particulates and thus create odor. When the vehicle is parked for an extended period, the concentrations of the gases and the suspended particulates increase. When a driver and/passengers enter the vehicle, the odor can become obvious to them because they are used to the fresh air outside and the concentrations of undesired gases/substances reach a certain level. To solve such problem, the U.S. Pat. No. 7,013,656B2 discloses a method to start ventilation function of an air conditioning system of a parked vehicle upon receipt a door unlock signal and a method to cleaning inside air in a passenger compartment by an air cleaning device.

Some vehicles are installed with an air mass sensor to notify a user whether an air purge is needed and an air purge degree. However, the sensor can be costly. The inventors of the present application have recognized that it is beneficial to notify the user the air purge status using a low-cost approach.

SUMMARY

According to one aspect of the invention, the invention discloses an air purge method in a vehicle, comprising starting a vehicle ventilation device in response to ventilation instructions; determining a current air purge status based on an operation time of the ventilation device; and indicating the current air purge status via an air purge indication device.

In one embodiment, the air purge method further comprises a stopping the vehicle ventilation device when the operation time exceeds a threshold.

In another embodiment, the air purge method further comprises stopping the vehicle ventilation device when the current air purge status exceeds a threshold.

In another embodiment, the air page status includes a percentage of an internal air purged.

In one embodiment, determining the current air purge status includes determining the current air purge status based on a ratio of the operation time to a predetermined air purge time, and wherein the predetermined air purge time is a time when all air in the vehicle is purged.

In one embodiment, determining the current air purge status includes determining the current air purge status based the current operation time and a look-up table.

In one embodiment, the air purge method further comprises operating the vehicle ventilation device at a greater power in response that a vehicle door is not opened; and operating the vehicle ventilation device at a less power in response that the vehicle door is opened.

In one embodiment, determining the current air purge status based on the operation time includes determining the current air purge status based on a first operation time when the vehicle ventilation device is operating at a greater power and a second operation time when the vehicle ventilation device is operating at a less power.

In one embodiment, the air purge method further comprises a generating the ventilation instruction in response to an unlocking of a vehicle door.

In one embodiment, the air purge method further comprises a generating the ventilation instruction in response to a condition that a time since an engine stopped exceed a predetermined time.

In one embodiment, the air purge method further comprises a generating ventilation instruction in response to a remote signal from a wireless network.

In one embodiment, the air purge indication device is positioned outside the vehicle, and the method further comprises a transmitting the air purge indication signal to the air purge indication device via a wireless network.

According to another aspect of the invention, the invention discloses an air purge method of a vehicle, comprising generating air purge instruction in response to unlocking of the vehicle; determining a current air purge percentage based on an operation time of a fan and a predetermined air purge time; indicating the current air purge percentage via an air purge indication device; and stopping the fan in response that the operation time exceeds a threshold.

In one embodiment, the air purge method further comprises an operating the fan with a first greater voltage in response to an unlocked door and operating the fan at a second less voltage in response to an opened door.

In one embodiment, determining the current air purge percentage based on a fan operating time and a predetermined air purge time comprising: determining the air purge status based on a ratio of a first time operating at the first voltage to the predetermined time; determining a second air purge status based on a ratio of a second time operated at the second voltage; and determining the current air purge status based on the first air purge status and the second air purge status.

According to another aspect of the invention, the invention discloses an air purge system of a vehicle, comprising a ventilation device; a controller configured to: starting the ventilation device to exchange air inside the vehicle with an outside air in respond to ventilation instruction; determining a current air purge status in response to an operation time of the ventilation device; transmitting an air purge indication signal to an air purge device; and an air purge indication device configured to indicate the current air purge status in response to the air purge indication signal.

In one embodiment, the controller is further configured to stop the ventilation device when the operation time exceeds a predetermined threshold time; and the ventilation device includes a fan in an air conditioning system and wherein the air conditioning system is at an external circulation status when the fan is started.

In one embodiment, the air purge indication device includes a display on an instrumental panel, a cell phone or a remote vehicle key.

In one embodiment, the air purge indication device further includes an air purge button to generate a start signal.

In one embodiment, the air purge system further comprises a detection unit to detect an opening status and a closed status of a vehicle door, and the controller is further configured to operate the ventilation device at a greater power in response to an unlocked vehicle door; and operate the ventilation device at a less power in response to an open state of the vehicle door.

According to one or more embodiments of the invention, the air purge method in a vehicle enables to determine current air purge status in a vehicle and provide the information to the user without a high cost special sensor.

BRIEF DESCRIPTION OF THE DRAWINGS

Example embodiments will be more clearly understood from the following brief description taken in conjunction with the accompanying drawings. The accompanying drawings represent non-limiting, example embodiments as described herein.

It should be noted that these figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. The use of similar or identical reference numbers in the various drawings is intended to indicate the presence of a similar or identical element or feature.

DETAILED DESCRIPTION

The disclosed methods and systems to purge inside air of a vehicle will become better understood through review of the following detailed description in conjunction with the figures. The detailed description and figures provide merely examples of the various inventions described herein. Those skilled in the art will understand that the disclosed examples may be varied, modified, and altered without departing from the scope of the inventions described herein. Many variations are contemplated for different applications and design considerations; however, for the sake of brevity, each and every contemplated variation is not individually described in the following detailed description.

Throughout the following detailed description, examples of various methods and systems to purge inside air of a vehicle are provided. Related features in the examples may be identical, similar, or dissimilar in different examples. For the sake of brevity, related features will not be redundantly explained in each example. Instead, the use of related feature names will cue the reader that the feature with a related feature name may be similar to the related feature in an example explained previously. Features specific to a given example will be described in that particular example. The reader should understand that a given feature need not be the same or similar to the specific portrayal of a related feature in any given figure or example.

Figure 1:
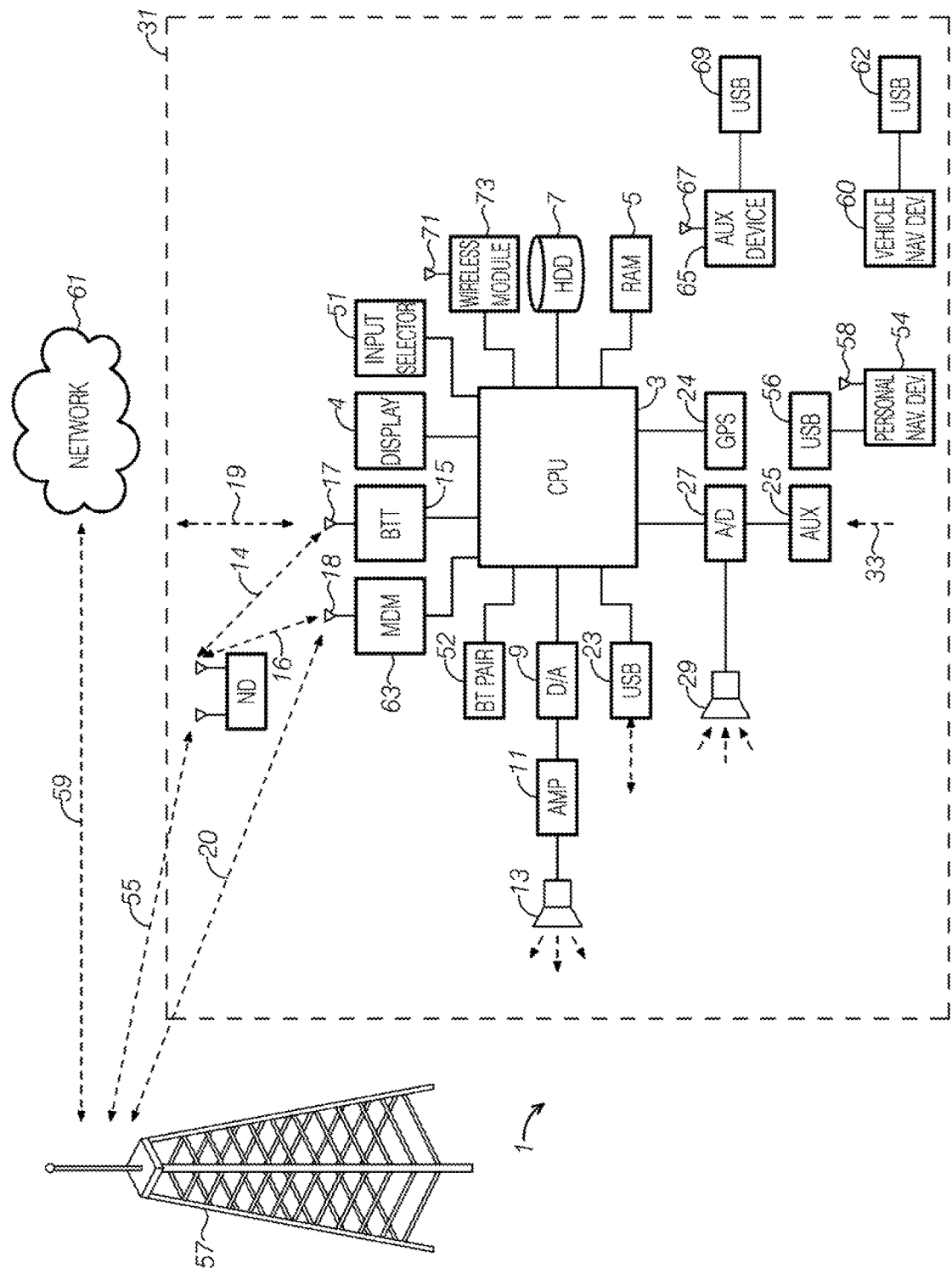
FIG. 1 illustrates an environment to implement methods and systems to purge inside air in a vehicle of the present disclosure.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, spoken dialog system with automatic speech recognition and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory.

In general speaking, persistent (non-persistent) storage includes all forms of storage keeping data when computers or other devices out power.

The processor is also provided with a number of different inputs allowing the user to interface with the processor. In this illustrative embodiment, a microphone 29, an auxiliary input 25 (for input 33), a USB input 23, a GPS input 24 and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous of the vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device can then be used to communicate 59 with a network 61 outside the vehicle 31 through, for example, communication 55 with a cellular tower 57. In some embodiments, tower 57 may be a WiFi access point.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device).

Bluetooth is a subset of the IEEE 802 PAN (Personal Area Network) protocols. IEEE 802 Lan (local area network) protocols include WiFi and have considerable cross-functionality with IEEE 802 PAN. Both are suitable for wireless communication within a vehicle. Another communication means that can be used in this realm is free-space optical communication (such as infrared data association (IrDA)) and non-standardized consumer infrared (IR) protocols.

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids with Code Domain Multiple Access (CDMA), Time Domain Multiple Access (TDMA), Space-Domain Multiple Access (SDMA) for digital cellular communication. These are all ITU IMT-200) (3G) compliant standards and offer data rates up to 2 mbs for stationary or walking users and 385 kbs for users in a moving vehicle. 3G standards are now being replaced by IMT-Advanced (4G) which offer 100 mbs for users in a vehicle and 1 gbs for stationary users.

If the user has a data-plan associated with the nomadic device 53, it is possible that the data-plan allows for broadband transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., WiFi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed. Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (firewire), EIA (Electronics Industry Association) serial protocols, IEEE 1284 (Centronics Port), S/PDIF (Sony/Philips Digital Interconnect Format) and USB-IF (USB FMC 5034 PUS 83413895 6 Implementers Forum) form the backbone of the device-device serial standards. Most of the protocols can be implemented for either electrical or optical communication.

Further, the CPU3 could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU 3 could be connected to a vehicle based wireless router 73, using for example a WiFi 71 transceiver. This could allow the CPU 3 to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing the process, since the wireless device would not "send and receive" information with itself. One of ordinary skill in the an will understand when it is inappropriate to apply a particular VACS to a given solution. In all solutions, it is contemplated that at least the vehicle computing system (VCS) located within the vehicle itself is capable of performing the exemplary processes.

In every illustrative embodiment discussed, the unlimited embodiment can be executed by the illustrated computing system. For every execution, the computing system may be configured as a dedicated processor to execute the routines for the limited purpose of implementation. It is not necessary to execute all the routines and it should be understood as examples to implement the elements of the present invention. Additional steps may be added to or omitted from the illustrative embodiments depending on the needs.

Figure 2:
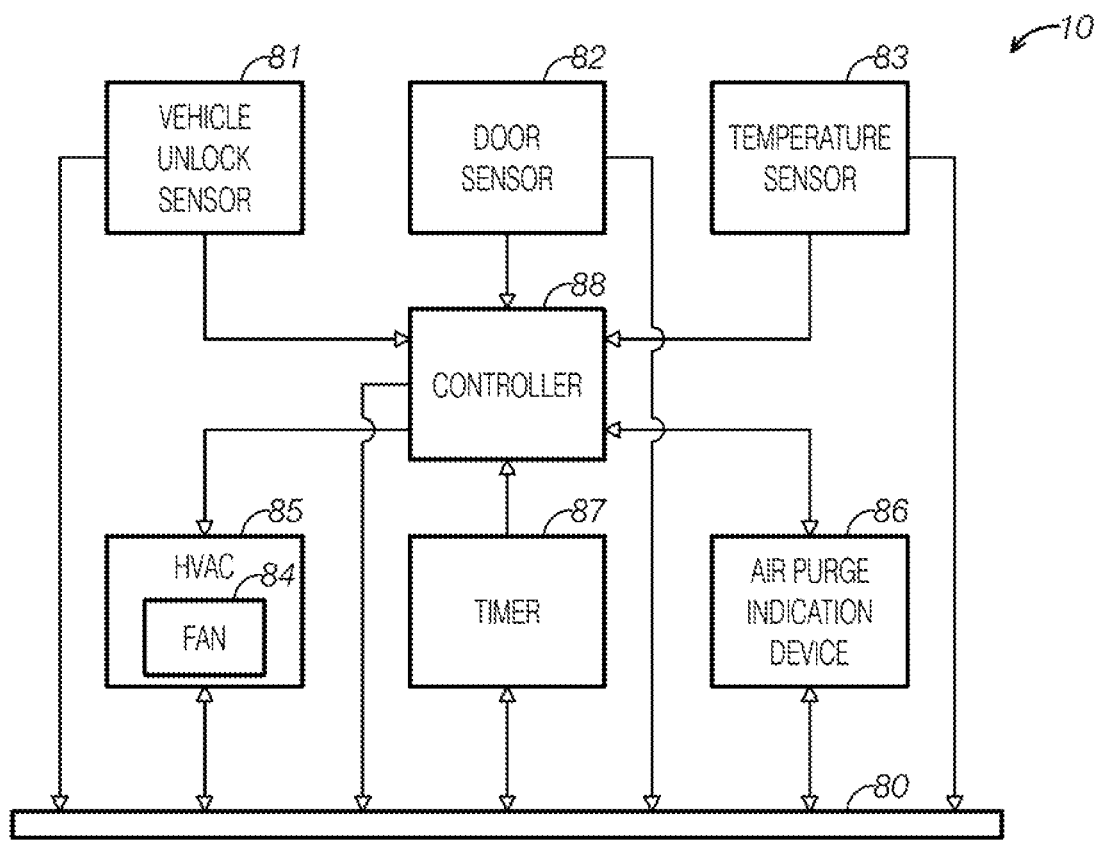
FIG. 2 shows a schematic block diagram of a system to purge inside air of a vehicle according to one embodiment of the present disclosure.

FIG. 2 shows a block diagram of an air purge system 10 of a vehicle according to one embodiment of the invention, illustrating one or more parts relevant to the air purge. It should be understood that the terms "air purge" and "air replacement" are interchangeably used and have the same meaning in the present application. The air purge system 10 includes a controller 88, a ventilation device 84, a vehicle lock/unlock sensor 81 to transmit vehicle unlocking data, a door sensor 82 to transmit data of vehicle door opening and closing, and a temperature sensor 83 to transmit temperature data of inside and outside of the vehicle. The controller 88 may be connected to these devices to receive the signals directly or receive or transfer signal from the Controller Area Network (CAN) 80. Some of the devices, such as vehicle lock/unlock sensor 81, may be connected with the controller 88 and an electronic lock via a remote network as depicted in FIG. 1. The controller 88 may be configured to include routines to implement the embodiments of the invention.

The air purge system 10 may include a ventilation device 84. As an example, the ventilation device may be a fan 84 of a heating, ventilation and air conditioning (HVAC) system 85 in a vehicle. The vehicle HVAC system 85 is at least switchable between an inner circulation mode and an external circulation mode. The inner circulation mode refers to the air circulation substantially conducted in the vehicle or a passenger compartment of the vehicle and no air exchange with the air outside the vehicle. The external circulation mode refers to the air exchange between the inside air in the vehicle and the air outside the vehicle (fresh air or ambient air). In other embodiments, the ventilation device 84 also includes a fan specifically configured to purge the inside air in the vehicle. As shown in FIG. 2, the ventilation device 84 may also be connected to a CAN bus to receive signal and respond the signal to operate.

The air purge system 10 may further include an air purge indication device 86 configured to indicate a current air purge status in response to an air purge indication signal from the controller 88. In one embodiment, the air purge indication device 86 may be a display 22 on an instrumental panel of the vehicle, for example, a screen of a human machine interaction device. In another embodiment, the air purge indication device 86 may be a screen of a cell phone or a remote vehicle key. Thus, a user can acquire the current air purge status in the vehicle when the user is outside the vehicle. In another embodiment, the air purge indication device 86 may be configured to include a switch to start or stop the ventilation device 84.

The ventilation system 10 may further include a timer 87 to provide information on an operation time of the ventilation system.

The ventilation system 10 may further include a controller 88 connecting or communicating with other devices in the vehicle or the vehicle CAN 80. The controller 88 may include a processor and a memory unit. It will be understood that the general processor of the vehicle may be temporarily used as a dedicated processor to implement the example methods or routines illustrated in the present application. When implementing code having instructions to implement some or all steps of the method, the general processor may be temporarily used as a dedicated processor until the method is completed. In another embodiment, at an appropriate level, the firmware operated based on the preconfigured processor may make the processor a dedicated processor to implement the method or other method with some variations.

Figure 3:
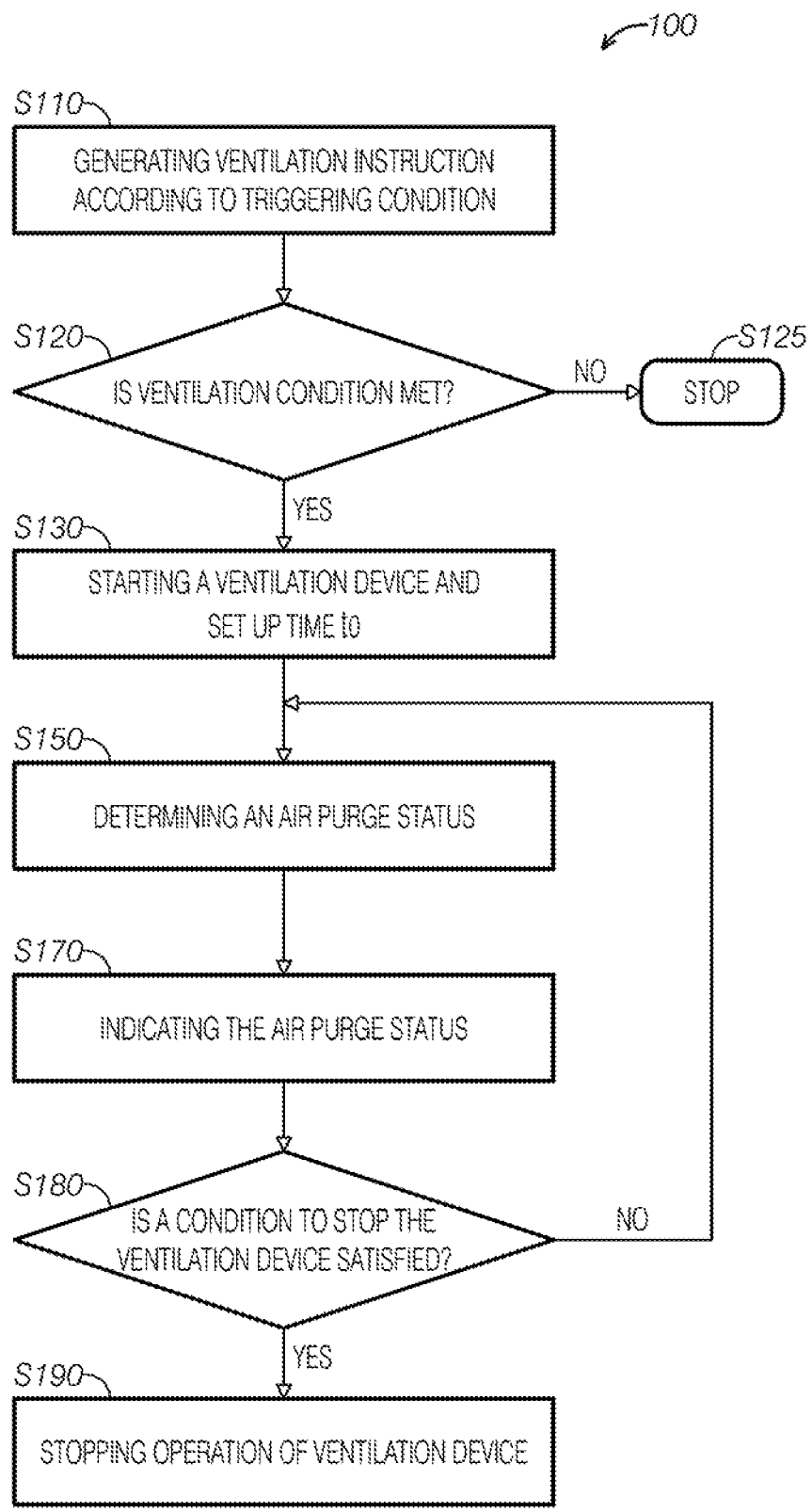
FIG. 3 shows a method to purge inside air of a vehicle according to one embodiment of the present disclosure.

FIGS. 3 to 6C depict example methods of purging air or replacing air in a vehicle according to one or more embodiments of the present application. A method 100 to purge air in a vehicle may include starting the ventilation device 84 in the vehicle in response to a ventilation signal, determining a current air purge status based on an operation time of the ventilation device 84, and indicating the current air purge status via the air purge indication device 86. In some embodiments as shown in FIG. 3, the method 100 includes generating ventilation instruction according to triggering conditions at S110.

Figure 4:
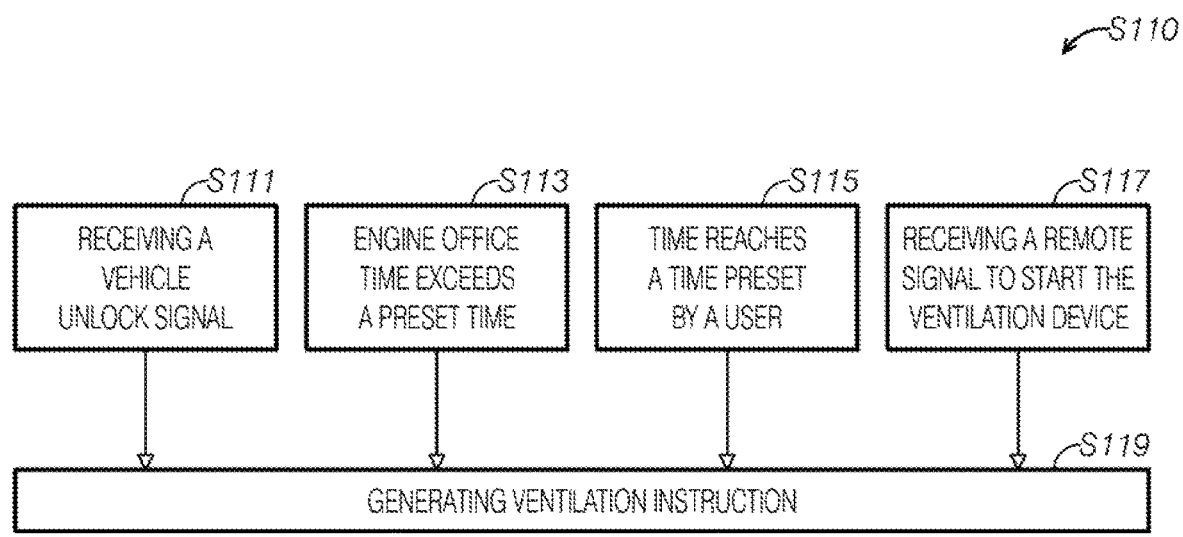
FIG. 4 show one or more embodiment to implement a step of the method in FIG. 3.

FIG. 4 illustrates triggering conditions to generate the ventilation instruction at the step S110, which includes sub-steps of the step S110. As described elsewhere in the present application, the air purge system 10 in a vehicle includes a lock and unlock sensor 82 connected to the controller 88 or connected to the CAN bus to transfer a signal or data on the locking or unlocking of the vehicle. In one example, the triggering condition is an unlock of a vehicle or unlock of a vehicle door. The method 100 includes receiving a vehicle unlocking signal at step S111, and then generate the ventilation instruction at the step S119.

Alternatively, the method 100 may generate the ventilation instructions at step S119 in response to a plurality of triggering conditions. These triggering conditions may include a condition that an engine off time exceeds a threshold time at step S113, a condition that a current time reaches a time preset by a user at step S115, or a condition of receiving a remote signal to start the ventilation device 84 sent by the user from other locations outside the vehicle at step S117. When any one of the above conditions is satisfied, the method 100 proceed to step S119 to generate the ventilation instruction.

Returning to FIG. 3, alternatively, after generating the ventilation instruction, the method 100 proceed to step S120 to judge whether a current condition meets a ventilation condition.

Figure 5:
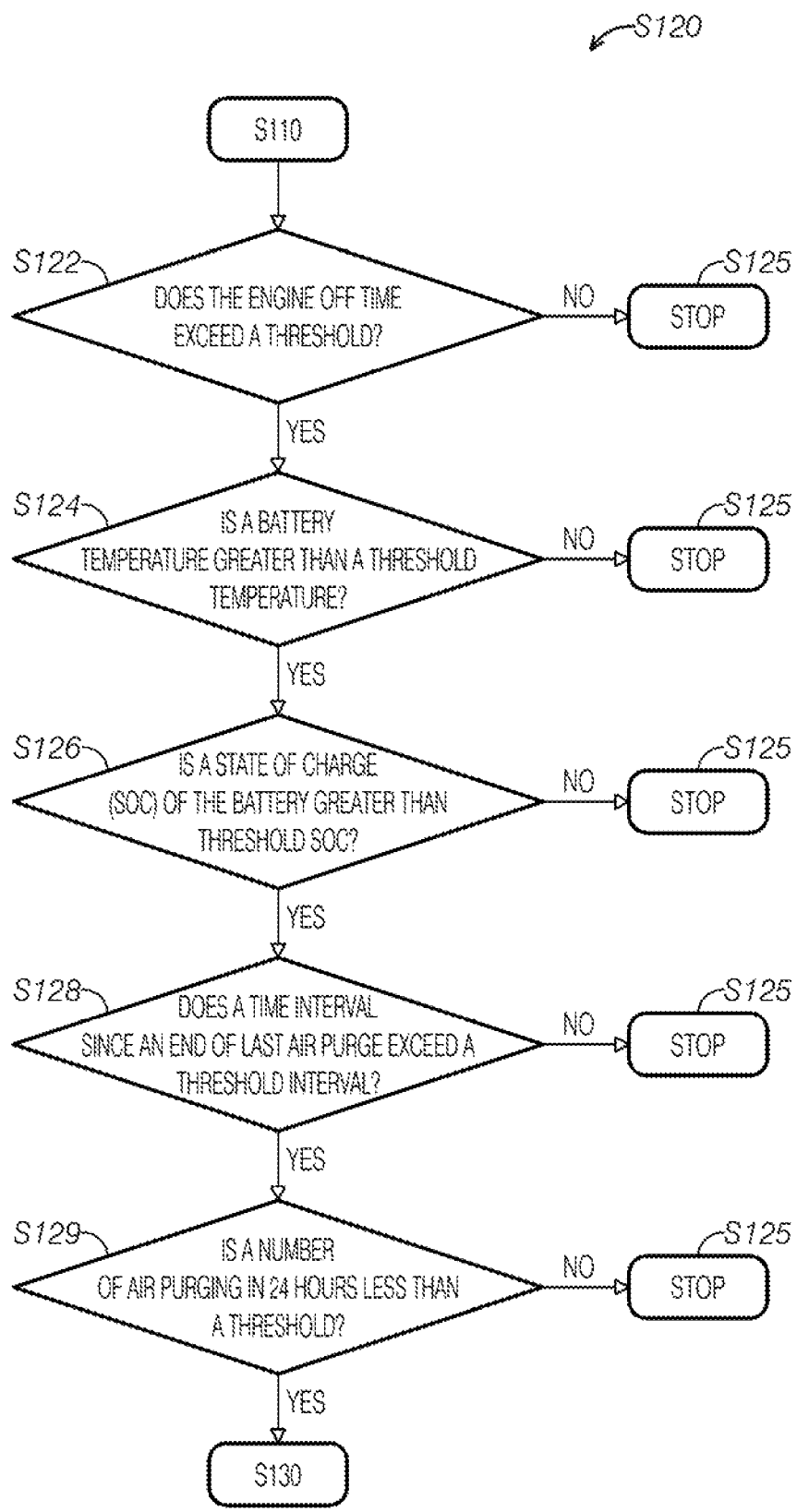
FIG. 5 shows conditions to implement one step of the method in FIG. 3.

Referring to FIG. 5, FIG. 5 shows an example embodiment of step S120 to judge whether the ventilation condition is satisfied. After generating the ventilation instruction at step S110, the method 100 determine whether the time since a previous engine off exceeds a threshold at step S122. For example, the controller 88 may calculate this time period based on a current time and the engine off time. If the time period is less than the threshold, then the method proceeds to S125 and stops. If the time period is greater than or equal to the threshold, then the method proceeds to S124. Thus, the air purge in the vehicle is started after the driver left the vehicle for a time period. The threshold may be preset by the manufacturer or preset by the user based on his or her needs. In one embodiment, the threshold may be 120 minutes. In another embodiment, the threshold may be 60 minutes, 90 minutes, or 150 minutes.

Next, at step S124, it may determine whether a temperature of a battery powering the ventilation device is greater than a threshold temperature. It should be understood that the battery may be a battery commonly used in a vehicle, or the battery may be a dedicated to power the ventilation device. The vehicle may further include a temperature sensor or a temperature sensing circuit near the battery to detect the battery temperature. When an ambient temperature is too low, it is not suitable for the battery to work. If the battery temperature is greater than the threshold temperature, then the method proceeds to step S126. If the battery temperature does not reach the threshold temperature, then the method goes to step S125 and ends the procedure. Thus, the method avoids starting the battery at a low temperature to run the battery operation inefficiently. For example, in a vehicle with an automatic stop/start, the threshold temperature may be set to be 10° C. In another example, in a vehicle without an automatic stop/start, the threshold temperature may be set to be 15° C. It should be understood that the threshold temperature may be set to be higher or lower based on needs, such as 0° C. 5° C., 14° C., or 19° C.

Next, at step S126, it may be determined whether a state of charge (SOC) of the battery is greater than a threshold SOC. The controller of the vehicle may calculate a current SOC of the battery based on a plurality of parameters of the battery. These parameters in unlimited examples include voltage, current, temperature, inner resistant, aging level, etc. If the SOC of the battery is greater than the threshold SOC, the method proceeds to step S128. If the SOC of the battery is lower than the threshold SOC, the method goes to step S125 and ends the procedure. In this way, the over charge of the battery can be prevented. In one embodiment, the SOC threshold may be 50%. It should be understood that the SOC threshold may be set to be a higher value such as 60% or 70% to enhance protection to the battery and may be also set be a lower value such as 20% or, 40% to purge air sufficiently in the vehicle.

Next, at step S128, it may be determined whether a time interval since an end of a last air purge exceeds a threshold interval. If so, the method proceeds to step S129. If the time interval does not exceed the threshold interval, the method goes to step S125 and ends the procedure to avoid repeated air purging in a short interval. The threshold interval may be preset by the manufacturer or set by the user based on a need. In one example, the threshold interval is 120 minutes. It should be understood that the threshold interval may be set a high value such as 180 minutes, or 240 minutes, based on needs to avoid frequently perform the air purging, or set to be a lower value such as 60 minutes or, 120 minutes to fully perform air purge.

Next, at step S129, it may be determined whether a number of air purging in 24 hours is less than a threshold. If the number is less than the threshold, the method proceeds to step S130 to start the ventilation device. If the number of the air purging in 24 hours has reached the threshold, the method goes to step S125 and ends the procedure to avoid excessively air purging in the vehicle. The threshold may be preset by the manufacturer or may be set by the user based on a need. In one example, the threshold is 3. It should be understood that the threshold number may be set to be different values such as 3, 4, or 5.

Returning to FIG. 3, when the method 100 determines that the condition is satisfied at step S120, the method proceeds to step S130. At step S130, the method 100 starts the ventilation device 84 in response to the received ventilation instruction and sets a current time as t0. Alternatively, while starting the ventilation device 84 such as fan 84 of the HVAC in the vehicle, the AC system in the vehicle is switched to an external circulation mode to exchange the inside air of the vehicle compartment with the outside air to achieve goal of having clean air in the vehicle compartment. Next, the method 100 proceeds to step S150.

At step S150, the method 100 may calculate an operation time $\Delta t$ of the ventilation device 84 based on the current time received by the timer, and determine the current air purging status based on the $\Delta t$. In one embodiment, the air purge status includes a percentage R of the air purged inside the vehicle or in the passenger compartment. In other embodiments, the air purge status may be represented by a statement such as "air purging completed", or "air purging in progress."

Figure 6A:
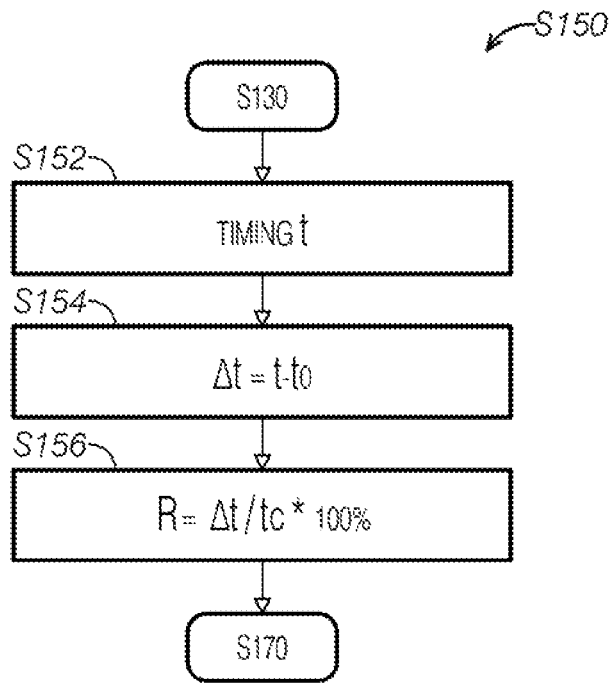
FIG. 6A shows an example method to determine an air purge status according to one embodiment of the present disclosure.
Figure 6B:
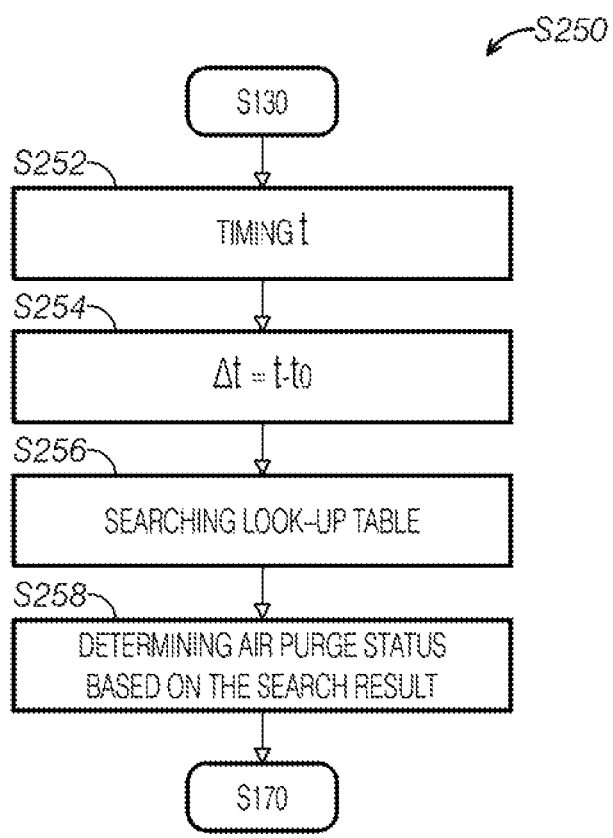
FIG. 6B shows an example method to determine an air purge status according to another embodiment of the present disclosure.
Figure 6C:
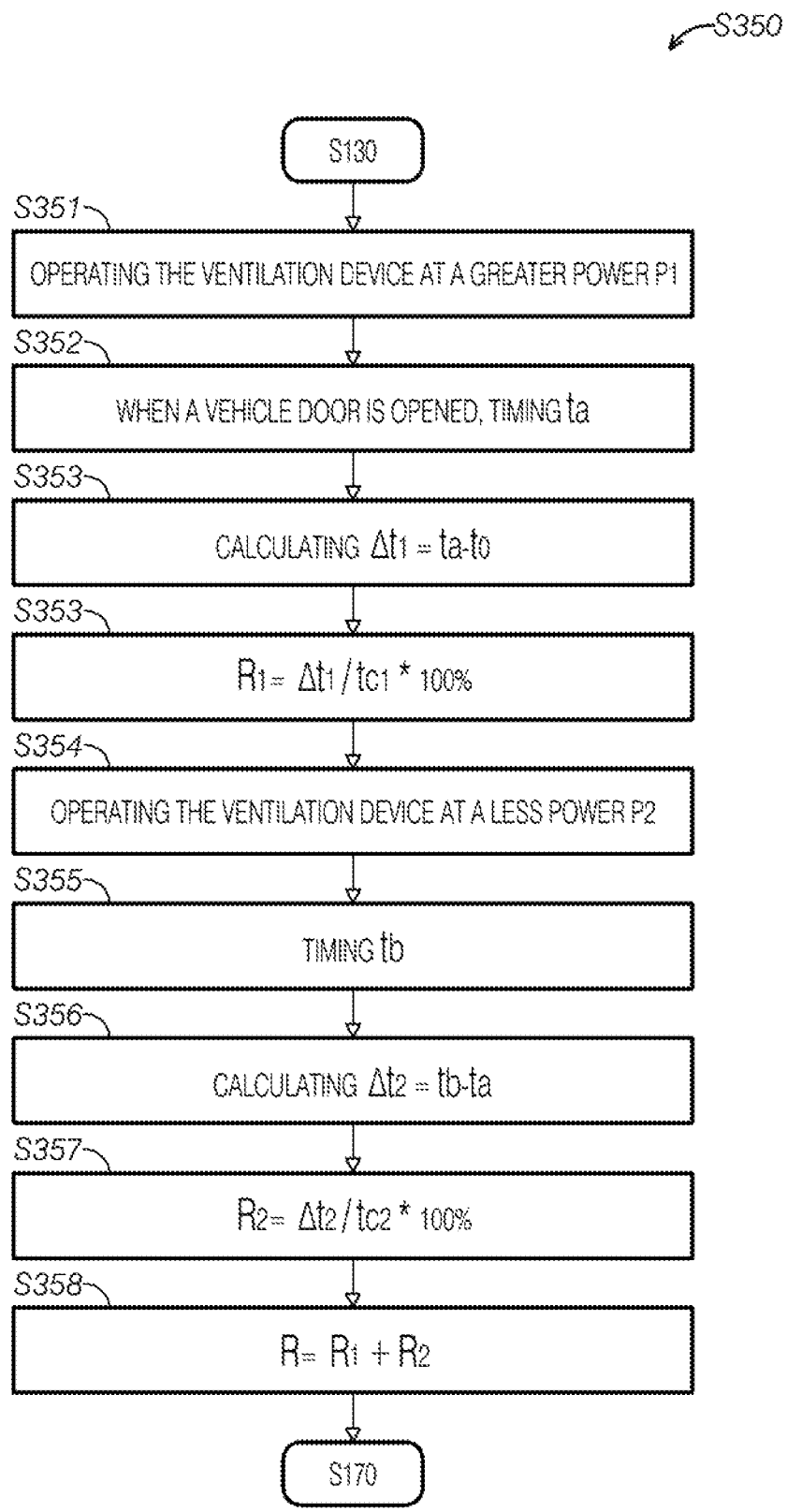
FIG. 6C shows an example method to determine an air purge status according to yet another embodiment of the present disclosure.

FIG. 6A to 6C schematically depict embodiments of determining air purging status based on the operation time of the ventilation device. Referring to FIG. 6A, FIG. 6A shows one embodiment of determining an air purging status. At step 152, the current time t is obtained. At step S154, the method may include calculating a time difference $\Delta t$ between the current time t and the starting time t0 of the ventilation device 84 by the controller 88. In other words, $\Delta t$ is a time interval of the operation time of ventilation device 84. Next, at step S156, the method may include determining a percentage R of the inside air in the vehicle that is purged based on a ratio of $\Delta t$ to tc by the controller 88. The tc may be a preset value. For example, tc may be a time to substantially purge or replace all air in the passenger compartment. In one example, tc is 120 minutes. In other embodiments, tc may be 60, 150, or 180 minutes. The tc may be preset by the manufacturer or set by the user based on a need. Next, the routine goes to step S170 to indicate an air purging status.

Referring to FIG. 6B, FIG. 6B shows another embodiment S250 of determining air purging status. Similar to the embodiment depicted in FIG. 6A, the controller 88 obtains a current time t at step S252 and calculates an operation time $\Delta t$ of the ventilation device 84 at step S254. Next, at step S256, the method may include searches a look-up table to determine a percentage of the purged air corresponding to the value $\Delta t$. Thus, based on the search results, an air purge status is determined at step S258. The look-up table stores data with correlation of $\Delta t$ to percentage of air purged. The look-up table may be obtained by experience or experimental data of lab and stored in a storage unit of the controller 88.

Referring to FIG. 6C, FIG. 6C shows another embodiment S350 of determining air purge status. As illustrated elsewhere of the present disclosure, the vehicle air purge system 10 includes a door sensor 82 to determine if the vehicle door is opened. At step S130, after starting the ventilation device and timing t0, the method 100 includes receiving a signal from the door sensor 82 and operating the ventilation device at a great power P1 in response to the signal that the door is not opened. For example, the method may operate the ventilation device at the maximum speed. In one embodiment, the method may operate the fan in the HVAC system with a first greater voltage such as the 12 V. For simplified purpose, the vehicle door sensor 82 is shown to determine if the vehicle door is open. In other embodiments, the method may use information from other door detection devices such as a sensor, an induction circuit, or signal from CAN to determine whether the vehicle door opens.

Next, in response to the vehicle door opened, the method obtains time ta at step S352, and calculates difference of ta and t0 at step S353, which is a time interval $\Delta t1$ of first operation time that the ventilation device 84 operates at a greater power. Thus, at step S353, the method calculates a first air purge degree of the ventilation device 84 before the vehicle door opens. For example, for simplified purpose, it determines a percentage R1 of the purged air relative to all the air in the vehicle based on the ratio of $\Delta t1$ to tc1, wherein tc1 is a preset value. For example, tc1 is a time needed to purge entire of the air in the vehicle at a greater power P1. Alternatively, R1 may be determined by a first look-up table that stores a correlation of the ventilation device operation time at a greater power P1 relative to the percentage of air purged.

Next at S354, responding to the signal that the vehicle door opens, the system 10 operates the ventilation device 84 at a low power P2, such as operates at a low speed. Thus, the user will not hear a large noise when the user opens the door and enters the vehicle. In one embodiment, the fan in the HVAC system is operated at a second lower voltage. It will be appreciated that the ventilation device 84 may be controlled via other parameters such as supplying currents with different magnitude.

Next, the method obtains current time tb at S355, and calculates a time difference of the current time tb and to at S356. The time difference is the second interval $\Delta t2$ when the ventilation device is operating at a low power P2. Thus, at step S357, the method further calculates a second air purge degree of the ventilation device 84 after the vehicle door is opened. It will be appreciated that the door may be subsequently closed and a driver or a passenger are in the vehicle after the door opening event. The method may determine a percentage R2 of air purge relative to the entire air in the vehicle based on a ratio of $\Delta t2$ to tc2. The tc2 is a preset value. For example, tc2 may be a time needed to purge entire air in the vehicle with the low power P2. Alternatively, R2 may be determined by the second look-up table that stores data correlating the ventilation device operation time at a low power P2 to the air purge percentage.

Next, at step S358, the method 100 determines air purge status in the vehicle at current time based on the first degree air purge and the second air purge degree. Next, the method moves to step S170 to indicate an air purge status.

Referring to FIG. 3, at step S170, the method 100 indicates an air purge status. As described elsewhere in this application, the air purge system in a vehicle may include an air purge indication device 86. For example, the air purge indication device 86 may include a visual interface 4 positioned in the vehicle 31. Alternatively, the air purge indication device 86 may be also located outside of the vehicle, such as the air purge indication device 86 may be a smart phone or a remote key with a user interface.

At step S170, the method 100 may generate an air purge status signal and transmit the signal to the air purge indication device 86 based on the air purge status determined at S150. The signal may be transmitted directly or transmitted via CAN or wireless network. Thus, the air purge indication device 86 can indicate a current air purge status.

Figure 7A:
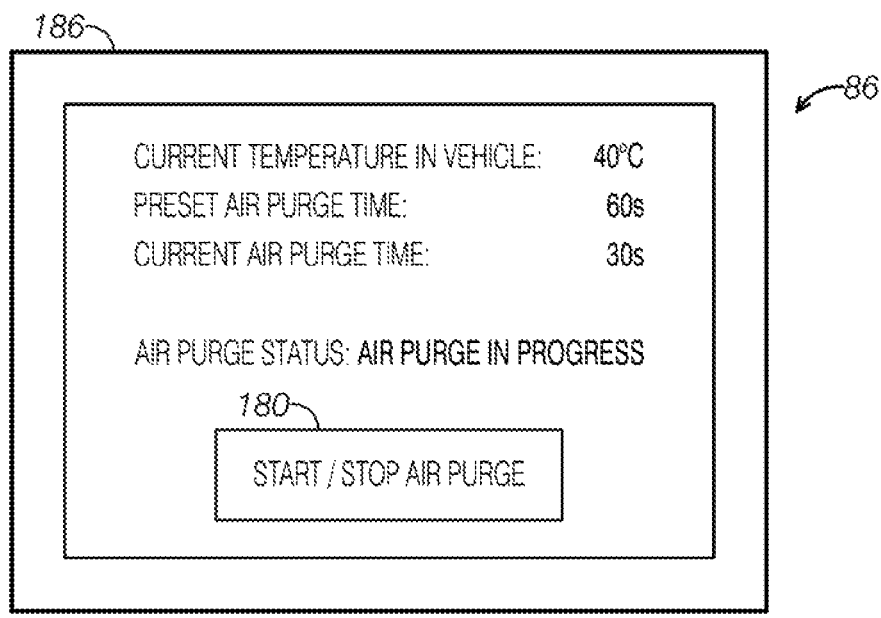
FIG. 7A show a user interface of an air purge indication device according to one embodiment of the present disclosure.

Referring to FIG. 7A, an example user interface 186 of the air purge indication device 86 is shown. The current air purge status is shown via text "air purge in progress" to remind a user that air purge is not completed at this time. In some embodiments, the air purge indication device 86 may include an air purge switch 180 to start and stop the air purge. For example, the switch 180 may generate a start signal and sends it to controller 88 of system 10 via CAN or wireless network upon initiation by a user. In the depicted embodiment, the switch 180 is shown as a virtual button positioned on the user interface 186. In other embodiments, the switch may be a physical switch located at other positions of the air purge indication device 86, or other positions in the vehicle. In the depicted embodiment, a current temperature in the vehicle, a preset air purge time and a current air purge time are shown on the user interface 186.

Figure 7B:
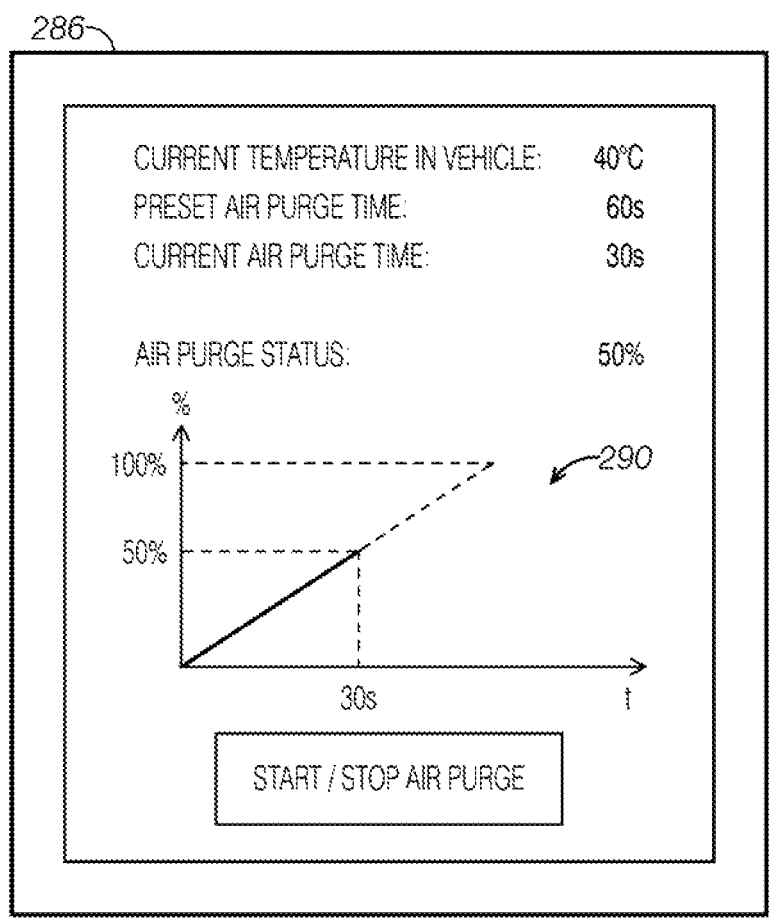
FIG. 7B show a user interface of an air purge indication device according to another embodiment of the present disclosure.

FIG. 7B shows another example user interface 286 of the air purge indication device 86. The current air purge status is displayed as a percentage of air purge in the vehicle. In addition, the user interface 286 displays a line 290 illustrating the relationship of the air purge time relative to the air purge percentage. For a purpose of illustration, FIG. 7B shows a linear relationship of the air purge time versus the air purge percentage. In other embodiments, the air purge time versus the air purge percentage may have a non-linear relationship. In the depicted embodiment, a current temperature in the vehicle, a preset air purge time and a current air purge time are shown on the user interface 286.

Turning back to FIG. 3, at step S180, the method 100 determines whether one or more stopping conditions to stop the ventilation device are satisfied. In one embodiment, the stopping condition includes a condition that the operation time $\Delta t$ or $\Delta t1 + \Delta t2$ exceeds the preset time. For example, when the operation time of the ventilation device 84 exceeds 120 minutes, the method 100 may determine the stopping condition is met and proceed to the step S190 to stop the operation of the ventilation device 84. Based on needs, the manufacturer or the user may set a preset value lower or higher, such as, 60 or 180 minutes.

In another embodiment, the stopping condition also includes a condition that a current air purge status exceeds a preset air purge value. For example, when the current air purge status exceeds 80%, the method may determine the stopping condition is met and proceed to step S190 to stop the ventilation device operation. Of course, the manufacturer or the user may set a preset value lower or higher, such as, 60, 90, 95, or 100%, as necessary.

At step S180, if the method 100 determines that a stopping condition is not met, the method 100 returns step S150.

The methods and systems to purge or replace the inside air of a vehicle of the present disclosure is simple for a user to operate and provide a cost-effectively way to determine and indicate the air purge status to a user.

The disclosure above encompasses multiple distinct inventions with independent utility. While each of these inventions has been disclosed in a particular form, the specific embodiments disclosed and illustrated above are not to be considered in a limiting sense as numerous variations are possible. The subject matter of the inventions includes all novel and non-obvious combinations and subcombinations of the various elements, features, functions and/or properties disclosed above and inherent to those skilled in the art pertaining to such inventions.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into computer readable storage medium in the engine control system.

It will be appreciated that the configurations and routines disclosed herein are exemplary in nature, and that these specific embodiments are not to be considered in a limiting sense, because numerous variations are possible.

The following claims particularly point out certain combinations and subcombinations regarded as novel and non-obvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application.

The invention claimed is:

1. An air purge method in a vehicle, comprising:
   starting a vehicle ventilation device in response to ventilation instruction;
   determining a current air purge status based on an operation time of the vehicle ventilation device, wherein the current air purge status is a ratio of the operation time to a predetermined air purge time and the predetermined air purge time is a time when all air in the vehicle is replaced;
   operating the vehicle ventilation device at a greater power in response to a condition that a vehicle door is not opened; and
   operating the vehicle ventilation device at a less power in response to a condition that the vehicle door is opened; and
   indicating the current air purge status via an air purge indication device;
   wherein determining the current air purge status based on the operation time includes determining a first air purge percentage based on a first operation time when the vehicle ventilation device is operating at the greater power and a first predetermined time, wherein the first predetermined time is a time needed to replace all air in the vehicle at the greater power; and determining a second air purge percentage based on a second operation time when the vehicle ventilation device is operating at the less power and a second predetermined time, wherein the second predetermined time is a time needed to replace all the air in the vehicle at the less power.

2. The air purge method of claim 1, further comprising stopping the vehicle ventilation device when the operation time exceeds a threshold.

3. The air purge method of claim 1, further comprising stopping the vehicle ventilation device when the current air purge status exceeds a threshold.

4. The air purge method of claim 1, wherein determining the current air purge status includes determining the ratio of the operation time to the predetermined air purge time based on a look-up table storing data with correlation of a current operation time to the ratio of the operation time to the predetermined air purge time.

5. The air purge method of claim 1, wherein determining the current air purge status based on the operation time includes
   determining the current air purge status by adding the first air purge percentage and the second air purge percentage.

6. The air purge method of claim 1, further comprising generating the ventilation instruction in response to an unlocking of the vehicle door.

7. The air purge method of claim 1, further comprising generating the ventilation instruction in response to a condition that a time since an engine stopped exceeds a predetermined time.

8. The air purge method of claim 1, further comprising generating the ventilation instruction in response to a remote signal from a wireless network.

9. The air purge method of claim 1, wherein the air purge indication device is positioned outside the vehicle, and the method further comprises transmitting an air purge indication signal to the air purge indication device via a wireless network.

10. An air purge method of a vehicle, comprising:
    generating ventilation instruction in response to unlocking of a vehicle door;
    starting a fan of a vehicle air conditioning system using an external circulation mode in response to the ventilation instruction;
    operating the fan with a first greater voltage in response to an unlocked door and operating the fan at a second less voltage in response to an opened door;
    determining a current air purge percentage based on an operation time of the fan and a predetermined air purge time, wherein the predetermined air purge time is a time needed when all air in the vehicle is replaced;
    indicating the current air purge percentage via an air purge indication device; and
    stopping the fan in response that the operation time exceeds a threshold;
    wherein determining the current air purge percentage based on a fan operating time and a predetermined air purge time comprising determining a first air purge percentage based on a ratio of a first time operating at the first greater voltage to a first predetermined time, wherein the first predetermined time is a time needed to replace all air in the vehicle at the first greater voltage; determining a second air purge percentage based on a ratio of a second time operating at the second less voltage to a second predetermined time, wherein the second predetermined time is a time needed to replace all the air in the vehicle at the second less voltage; and determining the current air purge percentage by adding the first air purge percentage and the second air purge percentage.

11. An air purge system in a vehicle, comprising
    a ventilation device, wherein the ventilation device is operated at a greater power in response to an unlocked door condition; and operated at a less power in response to an opened door condition;
    a controller configured to start the ventilation device to exchange air inside the vehicle with an outside air in response to ventilation instruction, and determine a current air purge status in response to an operation time of the ventilation device, wherein the current air purge status is a ratio of the operation time to a predetermined air purge time and the predetermined air purge time is a time when all air in the vehicle is replaced; wherein the current air purge status is determined by adding a first air purge percentage and a second air purge percentage, wherein the first air purge percentage is determined based on a first operation time when the ventilation device is operating at the greater power and a first predetermined time, and the first predetermined time is a time needed to replace all air in the vehicle at the greater power; and wherein the second air purge percentage is based on a second operation time when the ventilation device is operating at the less power and a second predetermined time, and the second predetermined time is a time needed to replace all the air in the vehicle at the less power; and
    an air purge indication device configured to receive an air purge indication signal and indicate the current air purge status in response to the air purge indication signal.

12. The air purge system of claim 11, wherein the controller is further configured to stop the ventilation device when the operation time exceeds a predetermined threshold time; and the ventilation device includes a fan in an air conditioning system, and wherein the air conditioning system is operating at an external circulation mode when the fan is started.

13. The air purge system of claim 11, wherein the air purge indication device includes a display located on an instrumental panel, a cell phone or a remote vehicle key.

14. The air purge system of claim 13, wherein the air purge indication device further includes an air purge button to start the ventilation device.

15. The air purge system of claim 11, further comprising a door sensor to detect the unlocked door condition and the opened door condition.

\* \* \* \* \*